US009112855B2

(12) United States Patent
Lu et al.

(10) Patent No.: US 9,112,855 B2
(45) Date of Patent: Aug. 18, 2015

(54) METHOD FOR IDENTIFYING PULSE OPTICAL SIGNAL AND DEVICE THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 250 days.

(21) Appl. No.: 13/806,311

(22) PCT Filed: Dec. 27, 2011

(86) PCT No.: PCT/CN2011/084748
§ 371 (c)(1),
(2), (4) Date: Dec. 21, 2012

(87) PCT Pub. No.: WO2013/075379
PCT Pub. Date: May 30, 2013

(65) Prior Publication Data
US 2014/0208403 A1 Jul. 24, 2014

(30) Foreign Application Priority Data

Nov. 24, 2011 (CN) .......................... 2011 1 0378445

(51) Int. Cl.
*H04L 29/06* (2006.01)
*G06F 21/00* (2013.01)
(Continued)

(52) U.S. Cl.
CPC .............. *H04L 63/0838* (2013.01); *H04K 1/00* (2013.01); *H04L 63/0823* (2013.01); *H04L 9/3226* (2013.01)

(58) Field of Classification Search
CPC .............. H04L 63/083; H04L 63/0838; H04L 63/0823; H04L 9/3226; H04K 1/00

USPC .............. 726/6; 370/537; 359/110; 455/41.1; 725/132
See application file for complete search history.

(56) References Cited

U.S. PATENT DOCUMENTS

| 6,738,392 B1 | 5/2004 | Thurston |
| 2002/0131099 A1* | 9/2002 | Harasawa ...................... 359/110 |

(Continued)

FOREIGN PATENT DOCUMENTS

| CN | 1812314 A | 8/2006 |
| CN | 1812316 A | 8/2006 |

(Continued)

OTHER PUBLICATIONS

Fok, M.P. ; Zhexing Wang ; Yanhua Deng ; Prucnal, P.R.; "Optical Layer Security in Fiber-Optic Networks"; Information Forensics and Security, IEEE Transactions on vol. 6 , Issue: 3 , Part: 1; DOI: 10.1109/TIFS.2011.2141990; Publication Year: Sep. 2011; pp. 725-736.*

(Continued)

*Primary Examiner* — Andrew Nalven
*Assistant Examiner* — Courtney Fields
(74) *Attorney, Agent, or Firm* — Fay Sharpe LLP

(57) ABSTRACT

The invention provides a method for identifying pulse optical signal, including: a. receiving first trigger information; b. collecting and identifying pulse optical signal with a predetermined method to obtain a unit of data; c. parsing the unit of data and determining type of it, if the unit of data is a unit of data representing header information, step d is executed; or if the unit of data is other type of unit of data, step b is executed; d. going on collecting and identifying pulse optical signal with the predetermined method to obtain a unit of data; e. determining whether all units of data corresponding to the unit of data representing the header information is received; f. packeting the unit of data representing the header information with all corresponding units of data into a group of data packets. The invention converts the pulse optical signal into bits, packets and converts the bits into a data packet, and receives the photosensitive-transfer information which accelerates the process of obtaining required data by a signal identifying device.

20 Claims, 6 Drawing Sheets

(51) Int. Cl.
*H04K 1/00* (2006.01)
*H04N 7/08* (2006.01)
*H04L 9/32* (2006.01)

(56) References Cited

U.S. PATENT DOCUMENTS

| | | | |
|---|---|---|---|
| 2003/0012073 A1 | 1/2003 | Shioyama | |
| 2005/0163427 A1* | 7/2005 | Ohta et al. | 385/37 |
| 2006/0067356 A1* | 3/2006 | Kim et al. | 370/452 |
| 2010/0178867 A1* | 7/2010 | Charrat | 455/41.1 |
| 2010/0321963 A1 | 12/2010 | Yamashita | |
| 2012/0072965 A1* | 3/2012 | Dewa | 725/132 |

FOREIGN PATENT DOCUMENTS

| | | |
|---|---|---|
| CN | 101567842 A | 10/2009 |
| WO | WO 0103434 A1 * | 1/2001 |

OTHER PUBLICATIONS

PCT/CN2011/084748 International Search Report.

* cited by examiner

METHOD FOR IDENTIFYING PULSE OPTICAL SIGNAL AND DEVICE THEREOF

FIELD OF THE INVENTION

The invention relates to the electronic device field and in particular to a method for identifying pulse optical signal and a device thereof.

BACKGROUND OF THE INVENTION

OTP, with the full name of One-time Password, also named dynamic password, is a time-based, unpredictable random number combination generated by a dynamic token according to a specific algorithm every certain time period. Each OTP can be used only for one time and 43200 OTPs are generated each day, thus it is be widely used in business such as online banking.

Comparing to a traditional dynamic token, the dynamic token which generates a dynamic password based on user information boasts of higher security and it receives user information with a built-in keyboard by a user before generating a dynamic password.

In sum, the prior art has shortcomings that in the process of doing the required business or inputting a quantity of user information each time, data is input manually, which is slow and easy to make mistakes, and once data is input by mistake, it is difficult to modify, as a result, the prior art lowers efficiency and correction rate of the OTP.

SUMMARY OF THE INVENTION

Based on disadvantages in the prior art, the invention provides a method for identifying a pulse optical signal and a device thereof. Advantage of the invention: the signal identifying device converts optical signal into bit information so as to obtain data packet information and with the method of the invention, all user information for generating a dynamic password is displayed in the form of optical signal and the signal identifying device obtains all data packets by collecting and identifying the pulse optical signal and the user information is transferred to the signal identifying device with in continuous method, which reduce inputting information by a person and increase efficiency of transferring large quantity of information.

A method for identifying pulse optical signal comprises:

A. receiving first trigger information and deleting data in a storage area;

B. collecting and identifying a pulse optical signal with a predetermined method to obtain a unit of data;

C. parsing the unit of data and determining type of the unit of data;

if the unit of data is unit of data representing header information, performing D;

if the unit of data is other type of unit of data, performing E;

D. setting a corresponding packet header id for the unit of data and going back to B;

E. determining whether the unit of data matches the currently-set packet header id; if yes, performing F; if no, discarding the unit of data and going back to B;

F. determining whether there is unreceived unit of data corresponding to the currently set packet header id; if yes, going back to B, if no, performing G;

G packeting the unit of data represented by the currently-set packet header id and all units of data corresponding to the currently-set packet header id to obtain a group of data packets.

Furthermore, After packeting the unit of data represented by the currently-set packet header id, and all units of data corresponding to the currently-set packet header id to obtain a group of data packets, the method further comprises:

H. determining whether all groups of data packets are obtained, if yes, performing I, if no, going back to B;

I. converting all groups of data packets into intermediate information;

J. extracting part or all of the intermediate information, converting the extracted information into third information and outputting the third information;

K. determining whether second trigger information is received within a predetermined time period; if yes, performing L; if no, prompting an error and quitting the operation;

L. generating a dynamic password according to the intermediate information and outputting the dynamic password.

Furthermore, after packeting the unit of data represented by the currently-set packet header id, and all units of data corresponding to the currently-set packet header id to obtain a group of data packets, the method further comprises:

H. determining whether all groups of data packets are obtained, if yes, performing I, if no, going back to B;

I. validating whether all the obtained groups of data packets are correct, if yes, performing K; if no, removing the incorrect data packets and corresponding packet header id and performing J;

J. determining whether all the correct data packets are not obtained within a predetermined time period, if yes, prompting an error and quitting the operation; if no, going back to B;

K. converting all the obtained groups of data packets into intermediate information;

L. extracting part or all of the intermediate information and converting the extracted information into third information and outputting the third information;

M. determining whether second trigger information has been received within a predetermined time period; if yes, performing N, if no, prompting an error and quitting the operation;

N. generating a dynamic password according to the intermediate information and outputting the dynamic password.

Furthermore, After packeting the unit of data represented by the currently-set packet header id and all units of data corresponding to the currently-set packet header id, to obtain a group of data packets, the method further comprises:

H. determining whether all groups of data packets are obtained, if yes, performing I, if no, going back to B;

I. validating whether all the obtained data packets are correct, if yes, performing J; if no, removing the incorrect data packets and corresponding packet header id and going back to B;

J. converting all the obtained groups of data packets into intermediate information;

K. extracting part or all of the intermediate information, converting the extracted information into third information and outputting the third information;

L. determining whether second trigger information is received within a predetermined time period, if yes, performing M; if no, prompting an error and quitting the operation;

M. generating a dynamic password according to the intermediate information and outputting the dynamic password.

Furthermore, after packeting the unit of data represented by the currently-set packet header id and all units of data corresponding to the currently-set packet header id to obtain a group of data packets, the method further comprises:

H. determining whether all groups of data packets are obtained, if yes, performing J, if no, going back to I;

I. determining whether not all data packets are received within a predetermined time period, if yes, prompting an error and quitting the operation; if no, going back to B;

J. converting all the obtained groups of data packets into intermediate information;

K. extracting part or all of the intermediate information, converting the extracted information into third information and outputting the third information;

L. determining whether second trigger information is received within a predetermined time period, if yes, performing M; if no, prompting an error and quitting the operation;

M. generating a dynamic password according to the intermediate information and outputting the dynamic password.

Furthermore, the predetermined method comprises:

B1. identifying the pulse optical signal collected at the same time with a predetermined receiving method to obtain at least one bit of information and taking the at least one bit of information as one bit of information group;

B2. determining whether the obtained at least one bit of information group constitutes one unit of data, if yes, combining the obtained at least one bit of information group to obtain a unit of data; if no, going back to B1;

Furthermore, wherein identifying pulse optical signal collected at the same time with a predetermined method comprises:

collecting the pulse optical signal emerging at the same time, identifying brightness status of at least one bit included in the pulse optical signal collected at the same time and obtaining each bit of information according to the identified brightness status; or collecting the pulse optical signal emerging at the same time, identifying color brightness of at lease one bit included in the pulse optical signal collected at the same time, and decomposing each color brightness to obtain proportion of three primary colors and according to which three bits of information represented by each color brightness is obtained;

Furthermore, the step of parsing the unit of data comprises:

parsing to obtain a format of the unit of data and determining whether the format of the unit of data is identical to format of the predetermined packet header data; if yes, the unit of data is a unit of data representing header information, performing D; if no, the unit data is other type of unit of data, performing E;

Furthermore, before the step of obtaining one unit of data, the method further comprises:

collecting the pulse optical signal and identifying an id representing beginning to receive a unit of data;

Furthermore, the step of determining whether all groups of data packets are obtained comprises determining whether each already-set packet header id is identical to each predetermined packet header id.

Furthermore, the step of generating a dynamic password according to the intermediate information and outputting the dynamic password comprises:

performing encryption computation on the intermediate information and a pre-stored first static factor to generate the dynamic password, and outputting the dynamic password; or performing encryption computation on the intermediate information, a first additional dynamic factor and the pre-stored first static factor to generate the dynamic password and outputting the dynamic password;

Furthermore, wherein the first additional dynamic factor is a time factor; or a times factor; or a combination of a group of random numbers and the time factor, or a combination of a group of random numbers and the times factor.

A method for identifying pulse optical signal comprises:

a. receiving first trigger information;

b. collecting and identifying a pulse optical signal according to a predetermined method to obtain a unit of data;

c. parsing the unit of data and determining type thereof, if the unit of data is a unit of data representing header information, going to d;

if the unit of data is other type of unit of data, discarding the unit of data and going to b;

d. continuing to collect and identify the pulse optical signal with the predetermined method to obtain a unit of data;

e. determining whether all units of data corresponding to the unit of data representing the header information is received, if yes, performing f; if no, going back to d;

f. packeting the unit of data representing the header information and all corresponding units of data to obtain a group of data packets.

Furthermore, after packeting the unit of data representing the header information and all corresponding units of data to obtain a group of data packets, the method further comprises:

g. determining whether all groups of data packets are obtained, if yes, performing h; if no, going back to b;

h. converting all the obtained groups of data packets into intermediate information;

i. extracting part or all of the intermediate information, converting the extracted information into third information and outputting the third information;

j. determining whether second trigger information is received within a predetermined time period, if yes, performing k; if no, prompting an error and quitting the operation;

k. generating a dynamic password according to the intermediate information and outputting the dynamic password.

Furthermore, after packeting the unit of data representing the header information and all corresponding units of data to obtain a group of data packets, the method further comprises:

g. determining whether all groups of data packets are obtained, if yes, performing h; if no, going back to b;

h. validating whether all the obtained data packets are correct, if yes, performing j; if no, removing the incorrect data packets and performing i;

i. determining whether not all the correct data packets are obtained within a predetermined time period, if yes, prompting an error and quitting the operation; if no, going back to b;

j. converting all the obtained groups of data packets into intermediate information;

k. extracting part or all of the intermediate information, converting the extracted information into third information and outputting the third information;

l. determining whether second trigger information is obtained within a predetermined time period, if yes, performing m; if no, prompting an error and quitting the operation;

m. generating a dynamic password according to the intermediate information and outputting the dynamic password.

Furthermore, after packeting the unit of data representing the header information and all corresponding units of data to obtain a group of data packets, the method further comprises:

g. determining whether all groups of data packets are obtained, if yes, performing h; if no, going back to b;

h. validating whether all the obtained data packets are correct, if yes, performing i; if no, removing the incorrect data packets and going back to b;

i. converting all the obtained groups of data packets into intermediate information;

j. extracting part or all of the intermediate information, converting the extracted information into third information and outputting the third information;

k. determining whether second trigger information is obtained within a predetermined time period, if yes, performing l; if no, prompting an error and quitting the operation;

l. generating a dynamic password according to the intermediate information and outputting the dynamic password.

Furthermore, after packeting the unit of data representing the header information and all corresponding units of data to obtain a group of data packets, the method further comprises:

g. determining whether all groups of data packets are obtained, if yes, performing i; if no, going back to h;

h. determining whether not all data packets are obtained within a predetermined time period; if yes, prompting an error and quitting the operation; if no, going back to b;

i. converting all the obtained groups of data packets into intermediate information;

j. extracting part or all of the intermediate information, converting the extracted information into third information and outputting the third information;

k. determining whether second trigger information is received within a predetermined time period, if yes, performing l; if no, prompting an error and quitting the operation;

l. generating a dynamic password according to the intermediate information and outputting the dynamic password.

Furthermore, the predetermined method further comprises:

b1. identifying the pulse optical signal collected at the same time with a predetermined method to obtain at least one bit of information and taking the at least one bit of information as one bit of information group;

b2. determining whether the at least one bit of information group can constitute a unit of data; if yes, combining the obtained at least one bit of information group into a unit of data; if no, going back to b1;

Furthermore, the identifying pulse optical signal collected at the same time with a predetermined method to obtain at least one bit of information comprises:

collecting the pulse optical signal emerging at the same time, identifying brightness status of at least one bit included in the pulse optical signal collected at the same time and obtaining each bit of information according to the identified brightness status; or collecting the pulse optical signal emerging at the same time, identifying at least of one color brightness representing the bit of information included in the pulse optical signal collected at the same time, decomposing each color brightness to obtain a proportion of the three primary colors and according to which three bits of information represented by each color brightness is obtained;

Furthermore, the parsing the unit of data comprises:

parsing to obtain a format of the unit of data and determining whether the format of the unit of data is identical to the format of the predetermined packet header; if yes, the unit of data being the unit of data representing the header information, performing d; if no, the unit of data being other type of unit of data, discarding the unit of data and going back to b;

Furthermore, before obtaining a unit of data, the method further comprises: collecting the pulse optical signal and identifying an id representing beginning to receive one unit of data.

Furthermore, the determining whether all groups of data packets are obtained comprises: determining whether format of each byte of the obtained data representing the packet header information is identical to the format of predetermined packet header information.

Furthermore, after parsing the unit of data as the unit of data representing the header information, the method further comprises: setting a packet header id for the unit of data representing the header information.

Furthermore, the determining whether all groups of data packets are obtained comprises: determining whether each already-set packet header id is identical to each preset packet header id.

Furthermore, the first additional dynamic factor is a time factor; or a times factor; or a combination of a group of random numbers and the time factor; or a combination of a group of random numbers and the times factor.

Furthermore, the generating a dynamic password according to the intermediate information and outputting the dynamic password comprises:

performing encryption computation on the intermediate information and the prestored first static factor to generate the dynamic password, and outputting the dynamic password; or performing encryption computation on the intermediate information, a first additional dynamic factor and the prestored first static factor to generate the dynamic password, and outputting the dynamic password.

The generating a dynamic password according to the intermediate information and outputting the dynamic password comprises:

performing encryption computation on the intermediate information and the prestored first static factor to generate the dynamic password, and outputting the dynamic password; or performing encryption computation on the intermediate information, a first additional dynamic factor and the prestored first static factor to generate the dynamic password, and outputting the dynamic password.

The generating a dynamic password according to the intermediate information and outputting the dynamic password comprises:

performing encryption computation on the intermediate information and a first prestored first static factor to generate the dynamic password and outputting the dynamic password; or performing encryption computation on the intermediate information, a first additional dynamic factor and the prestored first static factor to generate the dynamic password, and outputting the dynamic password.

The generating a dynamic password according to the intermediate information and outputting the dynamic password comprises:

performing encryption computation on the intermediate information and a prestored first static factor to generate the dynamic password, and outputting the dynamic password; or performing encryption computation on the intermediate information, a first additional dynamic factor and the prestored first static factor to generate the dynamic password, and outputting the dynamic password.

A device for identifying pulse optical signal, comprising a receiving module, a deleting module, a collecting and identifying module, a parsing module, a setting module, a first determining module, a second determining module and a combining module;

wherein, the receiving module is configured to receive first trigger information;

the deleting module is configured to delete data in a storage area in case that the receiving module receives the first trigger information;

the collecting and identifying module is configured to collect and identify a pulse optical signal with a predetermined method to obtain a unit of data;

the parsing module is configured to parse type of the unit of data;

the setting module is configured to set a corresponding packet header id for the unit of data in case that the type of the unit of data parsed by the parsing module is a unit of data representing the header information;

the first determining module is configured to determine whether the unit of data corresponds to the currently-set packet header id in case that type of the unit of data parsed by the parsing module is other type of unit of data;

the second determining module is configured to determine whether a unit of data corresponding to the currently-set packet header id is not obtained in case that the first determining module determines a positive result; and the combining module is configured to packet the unit of data represented by the currently-set packet header id and all units of data corresponding to the currently-set packet header id to obtain a group of data packets in case that the second determining module determines a negative result.

A device for identifying pulse optical signal comprises a receiving module, a first collecting and identifying module, a parsing module, a deleting module, a second collecting and identifying module, a determining module and a combining module;

wherein, the receiving module is configured to receive a first trigger information;

the first collecting and identifying module is configured to collect and identify the pulse optical signal with a predetermined method to obtain a unit of data;

the parsing module is configured to parse type of the unit of data;

the deleting module is configured to delete the unit of data in case that type of the unit of data parsed by the parsing module is other type of unit of data;

the second collecting and identifying module is configured to continue to collect and identify the pulse optical signal with a predetermined method to obtain a unit of data in case that type of the unit of data parsed by the parsing module is a unit of data representing header information;

the determining module is configured to determine whether all units of data corresponding to the unit of data representing the header information is received; and the combining module is configured to packet the unit of data representing the header information and all corresponding units of data to obtain a group of data packets in case that the determining module determines a positive result.

With the method applied by the invention, the user information is input only once and output in the form of pulse optical signal and the signal identifying device directly collects and identifies pulse optical signal to obtain required user information, which improves efficiency and correction rate of data transfer and avoids the trouble of inputting user information on the signal identifying device for one time.

DETAILED DESCRIPTION OF THE EMBODIMENTS

The embodiments of the invention provide a method for identifying pulse optical signal and a device thereof. In the embodiments, a signal identifying device with photosensitive function collects pulse optical signal, converts the pulse optical signal, takes the converted information as a dynamic factor to generate a dynamic password and transfers the information in the form of pulse optical signal, which ensures security of the dynamic factor. Preferred embodiments are detailed in accompanying with the below drawings. Notably, the below descriptions are just exemplary, not a limitation to the scope and application of the invention.

Embodiment 1

Figure 1:
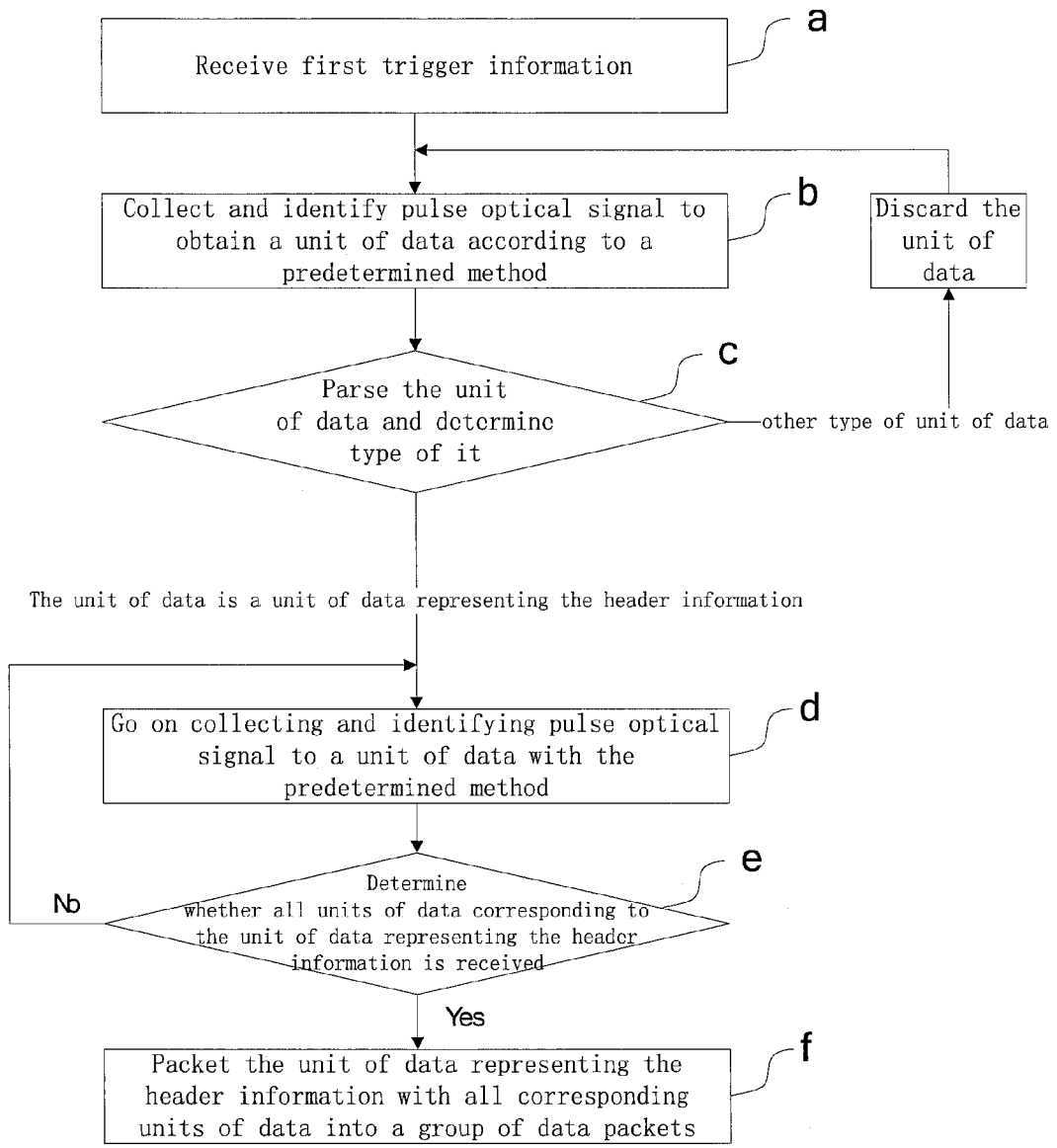
FIG. 1 illustrates a flow chart of the method for identifying pulse optical signal provided by the embodiment 1.

As shown in FIG. 1, a flow chart of the method for identifying pulse optical signal is provided by the embodiment, which includes steps as follows.

Step a: receive first trigger information, which is confirmation information of starting to collect pulse optical signal being input by a user.

Step b: collect and identify the pulse optical signal according to a predetermined method to obtain a unit of data.

The predetermined method includes:

Step b1: identify the pulse optical signal received at the same time according to a predetermined receiving method to obtain at least one bit of information and take the at lease one bit of information as one bit of information group;

Step b2: determine whether the received at least one bit of information group may constitute a unit of data;

if yes, combine the received at least one bit of information group to obtain a unit of data; if no, return to step b1.

In step b of the embodiment, after a client side outputs the pulse optical signal, a signal identifying device selects a location appropriate for it to collect the pulse optical signal on a screen of the client side to begin to collect the pulse optical signal.

Preferably, in the embodiment 1 of the invention, the unit of data may be a one-byte data, and therefore in step b of the embodiment, the signal identifying device combines predetermined bits of data according to a predetermined data combining method to obtain one-byte data; the predetermined data combining method includes taking every 8 bits of data being successfully identified as one-byte data by taking the bit firstly received as the highest bit, the bit secondly received bit as the higher bit, and so on.

Step c: parse the unit of data and determine type of it;

if the unit of data is a unit of data representing header information, step d is executed;

if the unit of data is other type of unit of data, the unit of data is discarded and the process goes back to step b.

In the embodiment, the signal identifying device determines whether the format of the obtained unit of data is identical to the format of a predetermined packet header.

Preferably, the unit of data in the embodiment is one-byte data.

Step d: go on collecting and identifying pulse optical signal according to the predetermined method, to obtain a unit of data with a same method as that used in step b.

Step e: determine whether all units of data corresponding to the unit of data representing the header information is received or not;

if yes, perform step f;

if no, go back to step d.

Step f: combine the unit of data representing the header information with all units of data corresponding to it to obtain a group of data packets.

The method provided by embodiment 1 of the invention converts pulse optical signal into data bits of information, combines and converts the bits of information into a data packet, and receives the transferred information in a photosensitive way without involvement of a person, with which the signal identifying device obtains required data more quickly.

Embodiment 2

The embodiment 2 details the method for obtaining a unit of data by collecting and identifying pulse optical signal according to a predetermined method in step b of embodiment 1.

Specifically, take the unit of data in the embodiment which is one byte of data as an example to explain the specific process of the method.

For the first method, upon receiving one-way pulse optical signal, the signal identifying device identifies pulse optical signal representing a beginning instruction according to a predetermined method, identifies the beginning of collecting one byte of data according to a received and identified id indicating a beginning to receive the one-byte data. In the embodiment, after receiving and identifying the beginning instruction, the signal identifying device begins to receive and identify pulse optical signal following the beginning instruction and identifies that the one-byte data has been received upon receiving an end instruction.

The method of identifying the bit of information as 1 or 0 with the predetermined receiving method includes identifying the received bit as 1 in case that the received status refers to a first brightness, and identifying the received data bit as 0 in case that the received status refers to a second brightness; or identifying the received bit as 0 in case that the received status refers to a first brightness and identifying the received bit as 1 in case that the received status is a second brightness; and the predetermined receiving method further includes a method for identifying a beginning instruction and an end instruction.

The method of identifying the bit of information as "1" or "0" with the predetermined receiving method also includes that the signal identifying device filters the received color brightness representing the bit information and decomposes the same to obtain three primary colors, determines three bits of information represented by the color brightness according to proportion of the decomposed three primary colors; if the proportion is higher than a critical proportion, the bit is determined as "1", if the proportion is lower than a critical proportion, the bit is determined as "0"; or if the proportion is higher than a critical proportion, the bit is determined as "0", if the proportion is lower than a critical proportion, the data bit is determined as "1".

For the second method, upon receiving multi-way pulse optical signals, the signal identifying device identifies the beginning to collect a one-byte data according to a received and identified id indicating the beginning to receive the one-byte data with a predetermined method, and specifically in the embodiment, upon receiving and identifying a pulse optical signal indicating a synchronization instruction, the signal identifying device receives a one-byte or a half-byte of pulse optical signal representing bits of information at the falling edge or rising edge of the synchronization instruction.

Upon receiving multi-way pulse optical signal at the same time, when the signal identifying device receives and identifies pulse optical signal representing a synchronization instruction, and at the same time receives pulse optical signal representing a beginning instruction with a predetermined receiving method, the signal identifying device identifies the beginning of collection of the one-byte data by receiving and identifying an id indicating the beginning to receive the one-byte data according to a predetermined receiving method. In the embodiment, the signal identifying device firstly identifies a pulse optical signal indicating the beginning instruction, and receives and identifies pulse optical signal following the pulse optical signal indicating the beginning instruction after receiving and identifying the beginning instruction, begins to receive a pulse optical signal indicating bits of information group at the rising edge (or falling edge) of the synchronization instruction, and identifies that the one-byte data has been received upon receiving an end instruction.

The method of synchronization instruction may be a clock signal, and the step of identifying bit of information as "1" or "0" with the predetermined receiving method includes; identifying the received bit as "1" in case that the received status indicates a first brightness, and identifying the received bit as "0" in case that the received status indicates a second brightness; or identifying the received bit as "0" in case that the received status indicates the first brightness and identifying the received bit as "1" in case that the received status indicates the second brightness;

and the predetermined receiving method also includes methods for identifying the synchronization instruction, the beginning instruction and the end instruction.

The method for identifying the bit of information as "1" or "0" with the predetermined receiving method further includes that the signal identifying device filters the received color brightness indicating the bit of information, and decomposes it to obtain three primary colors, and determines three bits of information represented by the color brightness according to proportion of the decomposed three primary colors, the bit is determined as "1" in case that the proportion is higher than a critical proportion and the bit is determined as "0" in case that the proportion is lower than the critical proportion; or the bit is determined as "0" in case that the proportion is higher than a critical proportion and the bit is determined as "1" in case that the proportion is lower than the critical proportion.

For the third method, upon receiving multi-way pulse optical signal at the same time, the signal identifying device identifies the beginning of the collection of one-byte data by receiving and identifying an id indicating a beginning to receive the one-byte data according to a predetermined receiving method; specifically in the embodiment, upon receiving and identifying a pulse optical signal indicating a distinction instruction, the signal identifying device determines a brightness status of the received pulse optical signal according to a critical brightness value output by the distinction instruction, and receives the pulse optical signal following the pulse optical signal indicating the beginning instruction upon receiving and identifying the pulse optical signal indicating the beginning instruction, and identifies that the one-byte data has been received upon receiving and identifying the pulse optical signal indicating the end instruction.

Upon receiving multi-way pulse optical signal at the same time, and receiving and identifying the pulse optical signal indicating the distinction instruct in with a predetermined receiving method, the signal identifying device receives and identifies a pulse optical signal indicating the one-byte data while receiving and identifying a critical brightness value output by the distinction instruction.

The method of identifying the bit of information as "1" or "0" with the predetermined receiving method includes identifying the received bit as "1" in case that the received status indicates a first brightness and identifying the received bit as "0" in case that the received status indicates a second brightness; or identifying the received bit as "0" in case that the received status indicates the first brightness and identifying the received bit as "1" in case that the received status indicates the second brightness; and the predetermined receiving method further includes methods for identifying the distinction instruction, the beginning instruction and the end instruction.

The method of identifying the bit of information as "1" or "0" with the predetermined receiving method may also include that the signal identifying device filters the received color brightness representing the bit of information, decomposes it into three primary colors, determines three bits of information represented by the color brightness according to proportion of the three primary colors decomposed, and the bit is determined as "1" in case that the proportion is higher than a critical proportion and the bit is determined as "0" in case that the proportion is lower than the critical proportion; or the bit is determined as "0" in case that the proportion is higher than the critical proportion and the bit is determined as "1" in case that the proportion is lower than the critical proportion.

Specifically in the method, the distinction instruction may be a differential signal and the pulse optical signal indicating the bits of information group is received and identified at the edge of the differential signal, and if several identical bytes emerge continuously in the output bits in the pulse optical signal, phase of the differential signal is reversed after transferring one byte of data and before transferring the next byte of data; and the signal identifying device begins to receive and identify a pulse optical signal indicating the next byte of data upon identifying a change in the differential signal according to a predetermined receiving method.

For the fourth method, upon receiving 8-way pulse optical signal at the same time, the signal identifying device identifies the beginning of the collection of one byte of data by receiving and identifying an id indicating a beginning to transfer the one byte of data according to a predetermined receiving method, and specifically in the embodiment the pulse optical signal indicating the one-byte data is received and identified at the same time, and then if the data being received and identified is data between first critical data and second critical data, the signal identifying device identifies content of the received one-byte data as real content by default.

Preferably, take the first critical data is binary data 0000 0001 and the second critical data being binary data 1111 1101 as an example, if the one-byte data received and identified by the signal identifying device is binary data between 0000 0001 and 1111 1101, the signal identifying device identifies content of the received one-byte data as real content by default.

If two continuous bytes of data being received and identified are respectively one byte of determination data and one byte of times id, the signal identifying device copies the one-byte data in front of the determination data continuously according to the times id with the predetermined receiving method.

In the embodiment, preferably, take the determination data is binary data 1111 1110 and the times id being binary data 0000 0010 as example, and if the two bytes of data being continuously received and identified are respectively binary data 1111 1110 and 0000 0010, the signal identifying device copies the one-byte data in front of 1111 1110 for two times continuously.

In case that the two bytes of data continuously received and identified are respectively one byte of determination data and one byte of location data, the signal identifying device determines content of the received real data with the two bytes of data according to the predetermined receiving method.

In the embodiment, preferably, if the two bytes of data being continuously received and identified are determination data, and one byte of location data in the format of binary data 0010 0000, the signal identifying device determines content of the received real data according to the two bytes of data, namely the determination data and 0010 0000, and the content of the received real data is 0000 0000; if the two bytes of data being continuously received and identified are determination data and location data in the format of binary data 00110000, the signal identifying device determines content of the received real data according to the two bytes of data, namely the determination data and 00110000, and the content of the received real data is 1111 1110; if the two bytes of data being continuously received and identified are determination data and location data in the format of binary data 0100 0000, the signal identifying device determines content of the received real data according to the two bytes of data, namely the determination data and 0100 0000, and the content of the received real data is 1111 1111.

The method of two continuous bytes of data indicating the real content is pre-defined in the predetermined receiving method, which can be any dynamic password identifiable method.

The method of identifying the bit of information as "1" or "0" with the predetermined receiving method includes that the bit is identified as "1" in case that the received status indicates the first brightness and the bit is identified as "0" in case that the received status indicates the second brightness; or the bit is identified as "0" in case that the received status indicates the first brightness and the bit is identified as "1" in case that the received status indicates the second brightness.

The identifying the bit of information as "1" or "0" with the predetermined receiving method may also include that the signal identifying device filters the received color brightness representing the bit of information, decomposes it into three primary colors and determines the three bits of information represented by the color brightness according to a proportion of the decomposed three primary colors, the bit is determined as "1" in case that the proportion is higher than a critical proportion and the bit is determined as "0" in case that the proportion is lower than the critical proportion; or the bit is determined as "0" in case that the proportion is higher than the critical proportion and the bit is determined as "1" in case that the proportion is lower than the critical proportion.

In the step b, the method of identifying the bit of information as "1" or "0" with the predetermined receiving method includes that the received bit is identified as "1" in case that the received status indicates a first brightness and the received bit is identified as "0" in case that the received status indicates a second brightness; or the received bit is identified as "0" in case that the received status indicates the first brightness and the received bit is identified as "1" in case that the received status indicates the second brightness;

and the predetermined receiving method further includes a method for identifying the distinction instruction in case of receiving a distinction instruction, or includes a method for identifying a beginning instruction and an end instruction in case of receiving a beginning instruction and an end instruction; or includes a method for identifying a synchronization instruction in case of receiving a synchronization instruction.

In the embodiment of the invention, the first brightness indicates a brightness status identified by the signal identifying device and the second brightness indicates a darkness status identified by the signal identifying device; or the first brightness indicates a darkness status identified by the signal identifying device and the second brightness indicates a brightness status identified by the signal identified device; wherein therefore the first brightness and the second brightness are relative conception, which are divided by a critical status between them.

The method of identifying the bit of information as "1" or "0" with the predetermined receiving method can further include that the signal identifying device filters the received color brightness representing the bit of information, decomposes it into three primary colors and determines the three bits of information represented by the color brightness according to a proportion of the decomposed three primary colors, and the bit is identified as "1" in case that the proportion is higher than a critical proportion and the bit is identified as "0" in case that the proportion is lower than the critical proportion; or the bit is identified as "0" in case that the proportion is higher than the critical proportion and the bit is identified as "1" in case that the proportion is lower than the critical proportion.

After step f in embodiment 1, all data packets are applied for generating dynamic password, and the signal identifying device verifies each received packet for ensuring correction of the dynamic password generated by the signal identifying device. The signal identifying device verifying each received packet and then generating a dynamic password is detailed in the following embodiment 3 and embodiment 4.

Embodiment 3

Figure 2:
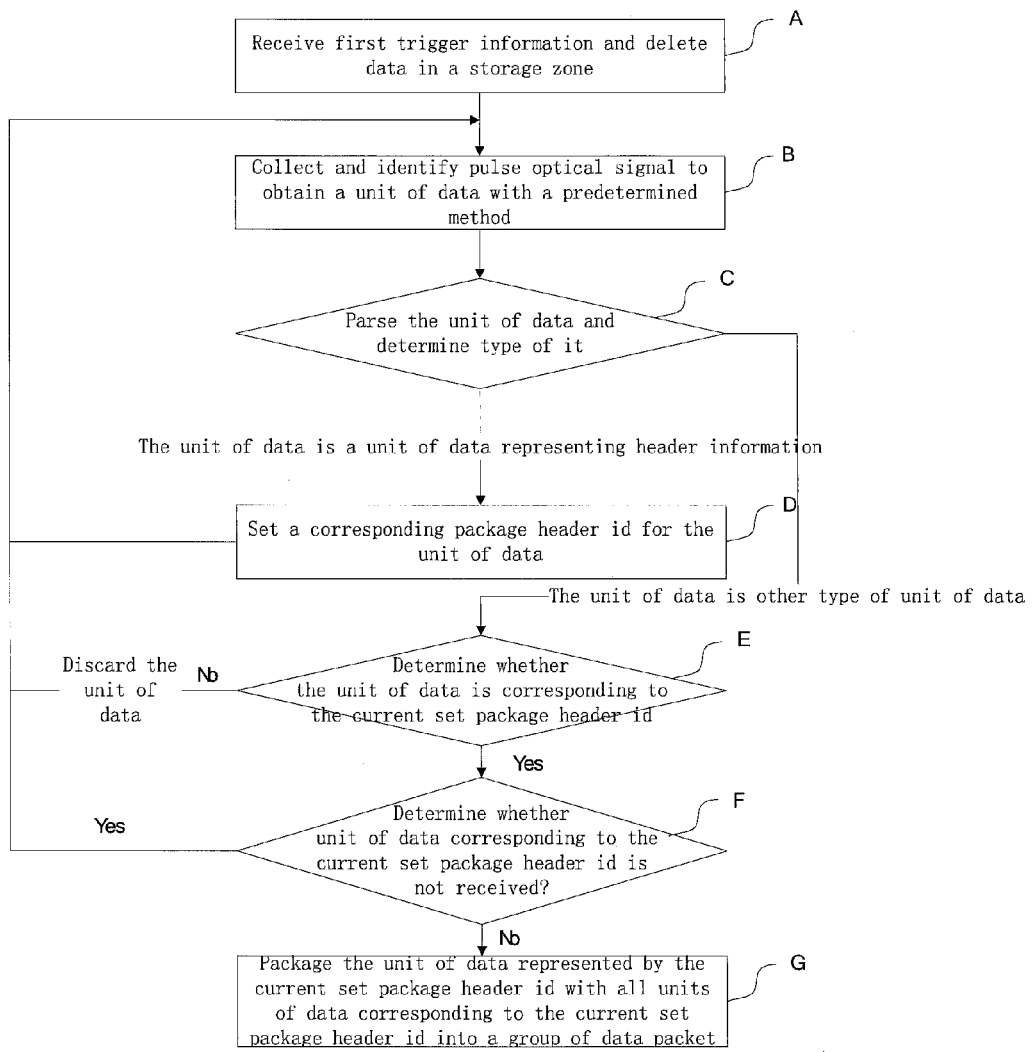
FIG. 2 illustrates a flow chart of another method for identifying pulse optical signal provided by the embodiment 3.

As shown in FIG. 2, a flow chart of another method for identifying pulse optical signal provided by the embodiment is illustrated, which includes the following steps.

Step A: first trigger information is received and data in the storage area is deleted.

Specifically, the first trigger information input by a user is confirmation information of beginning to collect pulse optical signal, input by a user.

Step B: pulse optical signal is collected and identified according to a predetermined method to obtain a unit of data.

In the embodiment 3, the step B is realized with a same method as that used in step b of embodiment 1.

In step B of the embodiment, the signal identifying device selects a location appropriate for it to collect the pulse optical signal on a screen of a user side to begin to collect the pulse optical signal after the user side outputs the dynamic pulse optical signal.

Specifically in embodiment 3 of the invention, the unit of data may be a one-byte data and therefore in step B, the signal identifying device combines predetermined bits of information to obtain a one-byte data according to a predetermined data combining method, for example combining every successfully identified 8 bits of data into a one-byte data according to an order of taking the first received as the highest bit, taking the second received as the higher bit, and so on.

Step C: the unit of data is parsed and type of it is determined.

If the unit of data is a unit of data representing header information, step D is executed; if the unit of data is other type of unit of data, step E is executed.

In the embodiment, the signal identifying device determines whether mark of the received unit of data is identical to any packet header id in a predetermined packet header id list.

Preferably, the unit of data may be a one-byte data.

Step D, a packet header id is assigned to the unit of data and step B is executed;

Step E, a determination is made of whether the unit of data corresponds to a currently set packet header id;

if yes, step F is executed; if no, the unit of data is discarded and step B is executed.

Step F, a determination is made of whether any unit of data corresponding to the currently set packet header id is not received;

if yes, step B is executed; if no, step G is executed.

Step G the unit of data represented by the currently set packet header id and all units of data corresponding to the currently set packet header id are packeted into a group of data packets.

The method in embodiment 3 of the invention converts pulse optical signal into bits of information, combines and converts the bits of information into a data packet, and receives transferred information by photosensitive way without involvement of a person, by which the signal identifying device obtains required data more quickly.

Embodiment 4

Figure 3:
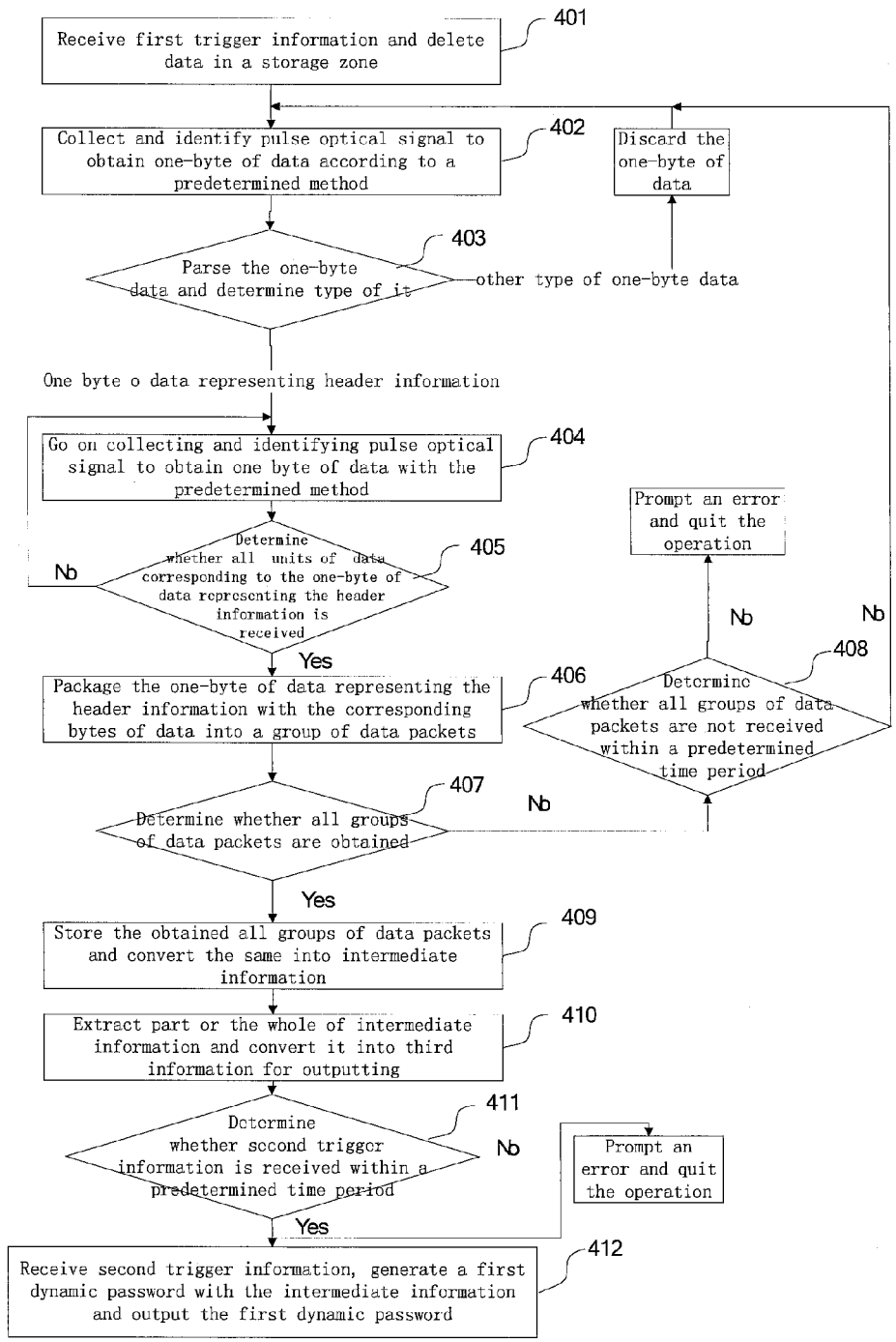
FIG. 3 illustrates a flow chart of method for identifying and using pulse optical signal to generate an OTP provided by the embodiment 4.

As shown in FIG. 3, a flow chart of a method for identifying pulse optical signal and applying the same to generate a dynamic password provided by the embodiment is illustrated.

In order to optimize the method provided by embodiment 1, the signal identifying device can further generate a dynamic password with the data packet after obtaining it, and the embodiment provides a whole process that the signal identifying device collects and identifies the pulse optical signal to obtain all the data packets, converts each data packet and generates a dynamic password with it.

In the embodiment, all units of data in the embodiment are given in format of byte. The method includes steps as below.

Step 401: first trigger information is received and data in a storage area is deleted.

Specifically, the first trigger information refers to confirmation information of beginning to collect pulse optical signal, input by a user.

Step 402: a one-byte data is obtained by collecting and identifying the pulse optical signal according to a predetermined method which is identical to that method used in step b of embodiment 1.

Step 403: the one-byte data is parsed and type of it is determined;

if the one-byte data refers to a one-byte data representing header information, step 404 is executed; and if the one-byte data refers to other type of one-byte data, it is discarded and step 402 is executed.

The signal identifying device determines whether the one-byte data is one-byte data representing header information according to a predetermined packet header format.

Notably, predetermined id uses unusable information in ASCII code table as the packet header information in avoidance of mixture with other data information.

For example, the predetermined id uses a0, a1, a2, a3 and etc. as the data packet header information with a rule of taking the first four bytes as id of the packet header and taking the following four bytes as serial number of the header information, and if the first four bytes of the received and identified one-byte data is 1010, the one-byte data is determined as packet header information.

In step 403, the signal identifying device, after determining that the received and identified one-byte data relates to one-byte data representing packet header mark, executes step 402 to obtain the next one-byte data; and repeats the execution and thus details of it is eliminated herein.

Step 404: one-byte data is obtained by going on collecting and identifying pulse optical signal according to the predetermined method which is identical to that method used in step 402.

Step 405: a determination is made of whether all bytes of data corresponding to the one-byte data representing the header information are received; if yes, step 406 is executed, if no, step 404 is executed.

Specifically, the determination of whether all bytes of data corresponding to the one-byte data representing the header information are received is aimed at combining the one-byte data representing the header information with all bytes of data corresponding to the one-byte of data, to obtain a data packet in the following step 406, and if positive determination result is obtained, step 406 is executed; or if a negative determination result is obtained, step 404 is executed and the signal identifying device goes on collects and identifies pulse optical signal with the predetermined method to obtain one-byte data till all bytes of data corresponding to the one-byte data representing the packet header id are received, and goes to step 406 for executing the following steps.

All bytes of data except for the one-byte data representing the header information in one data packet should corresponds to the one-byte data representing the header information.

Step 406: the one-byte data representing the header information and all bytes of data corresponding to it are packeted into a group of data packets.

The obtained group of data packets includes header information and data content, or header information, data content and length of the data, or header information, data content, length and check bit of the data.

If the data packet representing the header information, received and identified by the signal identifying device only includes header information and data content, or only includes header information, data content and length of the data, the signal identifying device executes step 407.

Step 407: a determination is made of whether all groups of data packets are obtained, if yes, step 409 is executed, and if no, step 408 is executed.

Determination of whether all groups of data packets are obtained is realized by a determination of whether format of each received byte of data representing packet header information is identical to the format of each piece of predetermined packet header information.

Step 408: a determination is made of whether all groups of data packets are not received within a predetermined time period, if yes, an error is prompt and the execution is quit, if no, step 402 is executed.

Step 409: all groups of obtained data packets are stored and converted into intermediate information.

For example, the following four groups of data packets are received and the whole intermediate information is extracted as third information in embodiment 4, and the four groups of data packets are arranged in a sequence of the user information rather than in a sequence that the signal identifying device receives and identifies the data packets.

a0 31 32 33 34 35 36
a1 31 31 31 31 32 32 32 32
a2 34 35 36 30 30
a3 36 35 34 33 32 31

In the four groups of data packets, a0 in the first group of data packet refers to the data header and 31 32 33 34 35 36 refers to the data content; a1 in the second group of data packet refers to the data header and 31 31 31 31 32 32 32 32 refers to the data content; a2 in the third group of data packet refers to the data header and 34 35 36 30 30 refers to the data content; a3 in the fourth group of data packet refers to the data header and 36 35 34 33 32 31 refers to the data content.

The signal identifying device receives the pulse optical signal in a cycling way as below:

. . . a1 . . . a2 . . . a3 . . . a0 . . . a1 . . . a2 . . . a3 . . . a0 . . . a1 . . . a2 . . . a3 . . . a0 . . . a1 . . .

The signal identifying device receives the data packet in an unregular sequence. For example, the data packet includes four groups of data packets, and bytes of the header information in each group of data packet are respectively a0, a1, a2 and a3, and if the first received and identified byte representing the header information is a1, the signal identifying device receives the data packet with header informational firstly, and then receives data packets respectively with header information a2 and a3 one by one, and receives data packet with header information a0 finally. The data packet with header information a0 being received indicates an end of receiving all the pulse optical signal.

The above four groups of data packets respectively represent a personal identity code, an account number, amount and additional information.

Personal identifier: 123456;
Account number: 11112222;
Amount: 45600;
Additional information: 654321.

Notably, the data information does not only include the above four groups of data packets, but also include time, address, user name, a first value or a challenge value and etc.

The embodiment takes an example of outputting Chinese information with 24*24 Simple Chinese characters library on a 240*128 pixels LCD display.

For example, the received data packet further includes a user name, and is a5 34 38 30 31 33 39 33 31 which is an area code representing Chinese character information, received and identified by the signal identifying device.

A standard library including Chinese characters is pre-stored in the signal identifying device; and thus the step includes determining the received and identified area code of two Chinese characters according to number of the received bytes, converting the area code into hexadecimal number 4801 and 3931; determining area where the Chinese character is according to the first byte of each area code and determines location of the Chinese character in the area according to the end byte; and computing the beginning address of the received area code in the Chinese character library according to a predetermined computing method, for example P=(S1−161−15)×94+(S2−161)×72+1, wherein S1 is the first byte and S2 is the second byte.

After retrieving the beginning address, the signal identifying device takes a required Chinese character font from the Chinese character library, obtains a dot-matrix values file corresponding to the Chinese character and outputs the Chinese character according to data in the dot matrix values file by display.

For example, the displayable Chinese character represented by the data packet is "小强" and dot-matrix values file of "qiang" includes db 00h, 00h, 00h, 03h, 10h, 18h, 7fh, 9fh, 0fch, 03h, 18h, 18h db 03h, 18h, 18h, 03h, 18h, 18h, 03h, 1fh, 0f8h, 23h, 11h, 98h db 3fh, 01h, 80h, 32h, 21h, 8ch, 30h, 3fh, 0feh, 30h, 31h, 8ch db 33h, 31h, 8ch, 7fh, 0b1h, 8ch, 23h, 31h, 8ch, 03h, 3fh, 0fch db 03h, 31h, 88h, 03h, 01h, 80h, 03h, 01h, 90h, 03h, 01h, 98h db 07h, 7fh, 0fch, 3eh, 3ch, 0ch, 0ch, 10h, 08h, 00h, 00h The signal identifying device displays the corresponding Chinese character on the screen after identifying the above data.

Step 410: part or all of the intermediate information is extracted and converted into third information for outputting.

If part of the intermediate information is extracted as the third information, the third information for outputting is listed as below:

Personal id: 123456;
Account number: 11112222
Amount: 45600.

Step 411: a determination is made of whether second trigger information has been received within a predetermined time period, if yes, step 412 is executed, if no, an error is prompted and all operations are ended.

Specifically, the second trigger information is confirmation information of the signal identifying device generating a dynamic password.

Preferably, the predetermined time period is 60 seconds.

Step 412: the second trigger information is received and a first dynamic password is generated according to the intermediate information and output.

Specifically, the method of generating the dynamic password includes that the signal identifying device takes the intermediate information as the first dynamic factor, encrypts the first dynamic factor and a pre-stored static factor with built-in algorithm to generate the first dynamic password and outputs the first dynamic password.

The dynamic password generating method also includes that the signal identifying device takes the intermediate information as the first dynamic factor and encrypts the first dynamic factor, a first additional dynamic factor and the first static factor pre-stored to generate the first dynamic password and outputs the first dynamic password.

The first additional dynamic factor is one of time factor and times factor, or a combination of a group of random numbers and times factor (times factor).

The group of random numbers are those generated by the signal identifying device; or generated by the server, and may be sent to the client side by the server and be output in the form of pulse optical signal, and the pulse identifying device obtains the group of random numbers by collecting pulse optical signal.

In embodiment 4 of the invention, if the received one-byte data is one-byte data representing the header information in step 403, a packet header id is set for the one-byte data representing the header information.

Correspondingly, the step 407 can be replaced with the following step 2-407.

Step 2-407, a determination is made as to whether all groups of data packets are obtained; if yes, step 408 is executed; if no, step 402 is executed.

Specifically, the determination as to whether all groups of data packets are obtained is realized by determining whether each obtained packet header id representing the packet header information is identical to each predetermined packet header id.

In the embodiment 4, if the signal identifying device receives a pulse optical signal including information representing personal identity code, it determines the obtained data packet representing a personal identity code according to the packet header information, validates the data packet, and goes to the following steps after the validation is passed or prompts an error after the validation is failed.

The process of validating whether the personal identity code is correct includes that the signal identifying device compares, in accordance with the predetermined personal identity code, each byte of the received and identified personal identity code with the corresponding bits of the predetermined personal identity code with the predetermined personal identity code, and goes on receiving and determining the next byte of information in case of a successful comparison and with the same step, the signal identifying device successfully comparing all data representing the personal identity code indicates a correct personal identity code; or in case of a failed comparison because of a wrong byte, the signal identifying device determines an incorrect personal identity code and prompts an error.

If the data packet representing the header information, obtained by the signal identifying device includes header information, data content, length and a check bit in step 406 of the embodiment, steps 408-409 in embodiment 4 can be replaced with steps 408'-410'.

Step 408': validation is made of whether the whole obtained data packets are correct; if yes, step 410' is executed; or if no, the incorrect data packets are deleted and step 409' is executed.

Whether each data packet is correct is validated by the last check bit of the data packet.

Step 409': a determination is made of whether all correct data packets are not received within a predetermined time period; if yes, the signal identifying device prompts an error and quits the operation; if no, step 402 is executed.

Step 410', all obtained groups of data packets are stored and converted into intermediate information.

For example, the following four groups of data packets including length information and a check bit are received and the whole intermediate information is extracted as third information in embodiment 4, and the four groups of data packets are arranged in a sequence of user information rather than in a sequence that the signal identifying device receives and identifies the data packets.

a0 7 31 32 33 34 35 36 0
a1 9 31 31 31 31 32 32 32 32 9
a2 6 34 35 36 30 30 22
a3 7 36 35 34 33 32 31 22

In the first group of data packet of the above four groups, a0 refers to a data header, 7 refers to length of the data content, 0 refers to a check byte of the data packet and 31 32 33 34 35 36 refers to data content; correspondingly, in the second group of data packet, a1 refers to a data header, 9 refers to length of the data content, 9 refers to a check byte of the data packet and 31 31 31 31 32 32 32 32 refers to data content; in the third group of data packet, a2 refers to a data header, 6 refers to length of the data content, 22 refers to a check byte of the data packet and 34 35 36 30 30 refers to the data content; and in the fourth group of the data packet, a3 refers to a data header, 7 refers to length of the data content, 22 refers to a check byte of the data packet and 36 35 34 33 32 31 refers to the data content.

The signal identifying device receives pulse optical signal in a cycling way, such as . . . a1 . . . a2 . . . a3 . . . a0 . . . a1 . . . a2 . . . a3 . . . a0 . . . a1 . . . a2 . . . a3 . . . a0 . . . a1 . . .

The signal identifying device receives the data packets in an irregular sequence.

For example, the data packet includes four groups of data packets, and bytes of header information in each group of data packet are respectively a0, a1, a2 and a3, and if the first received and identified byte representing the header information is a1, the signal identifying device receives the data packet with header informational firstly, and then receives data packets respectively with header information a2 and a3 one by one, and receives data packet with header information a0 finally. The data packet with header information a0 being received indicates an end of receiving all the pulse optical signal.

The above four groups of data packets respectively represent a personal id code, an account number, amount and additional information.

Personal id code: 123456;
Account number: 11112222;
Amount: 45600;
Additional information: 654321;

Notably, the information not only includes the above four groups of data packets, but also includes information such as time, an address, a user name, a first value or a challenge value, etc.

The embodiment takes an example of outputting Chinese information with 24*24 Simple Chinese characters library on a 240*128 pixels LCD display.

Specifically, the received data packet further includes a user name, and is a5 34 38 30 31 33 39 33 31 which is an area code representing Chinese character information, received and identified by the signal identifying device.

A standard library including Chinese characters is pre-stored in the signal identifying device; and thus the step includes determining the received and identified area code of two Chinese characters according to number of the received bytes, converting the area code into hexadecimal number 4801 and 3931; determining area where the Chinese character is according to the first byte of each area code and determines location of the Chinese character in the area according to the end byte; and computing the beginning address of the received area code in the Chinese character library according to a predetermined computing method, for example P=(S1−161−15)×94+(S2−161)×72+1 wherein S1 is the first byte and S2 is the second byte.

After retrieving the beginning address, the signal identifying device takes a required Chinese character font from the Chinese character library, obtains a dot-matrix values file corresponding to the Chinese character and outputs the Chinese character according to data in the dot matrix values file by display.

For example, the displayable Chinese character represented by the data packet is "小强" and dot-matrix values file of "qiang" includes db 00h, 00h, 00h, 03h, 10h, 18h, 7fh, 9fh, 0fch, 03h, 18h, 18h db 03h, 18h, 18h, 03h, 18h, 18h, 03h, 1fh, 0f8h, 23h, 11h, 98h db 3fh, 01h, 80h, 32h, 21h, 8ch, 30h, 3fh, 0feh, 30h, 31h, 8ch db 33h, 31h, 8ch, 7fh, 0b1h, 8ch, 23h, 31h, 8ch, 03h, 3fh, 0fch db 03h, 31h, 88h, 03h, 01h, 80h, 03h, 01h, 90h, 03h, 01h, 98h db 07h, 7fh, 0fch, 3eh, 3ch, 0ch, 0ch, 10h, 08h, 00h, 00h The signal identifying device displays the corresponding Chinese character on the screen after identifying the above data.

In the embodiment 4, if the data packet representing the header information, received and identified by the signal identifying device includes header information, data content, length and a check bit and in the following steps, if the received pulse optical signal includes information representing a personal identity code, the signal identifying device validates the data packet after receiving the data package representing the personal identity code, and if the validation is passed, the following step is executed; or if the validation is failed, an error is prompted.

The process of validating whether the personal identity code is correct includes that the signal identifying device determines whether the received length is identical to length of the predetermined personal identity code according to the predetermined personal identity code, if no, it determines that the personal identity code is not correct, and the signal identifying device goes on validating the data content;

the signal identifying device compares each byte of the received data content to the corresponding bits of the predetermined personal identity code, goes on receiving and determining the next byte of information in case of a successful comparison and with the same step, the signal identifying device successful comparing all data representing the personal identity code indicates a correct personal identity code; or in case of a failed comparison because of a wrong byte, the signal identifying device determines an incorrect personal identity code and prompts an error.

Embodiment 5

Figure 4:
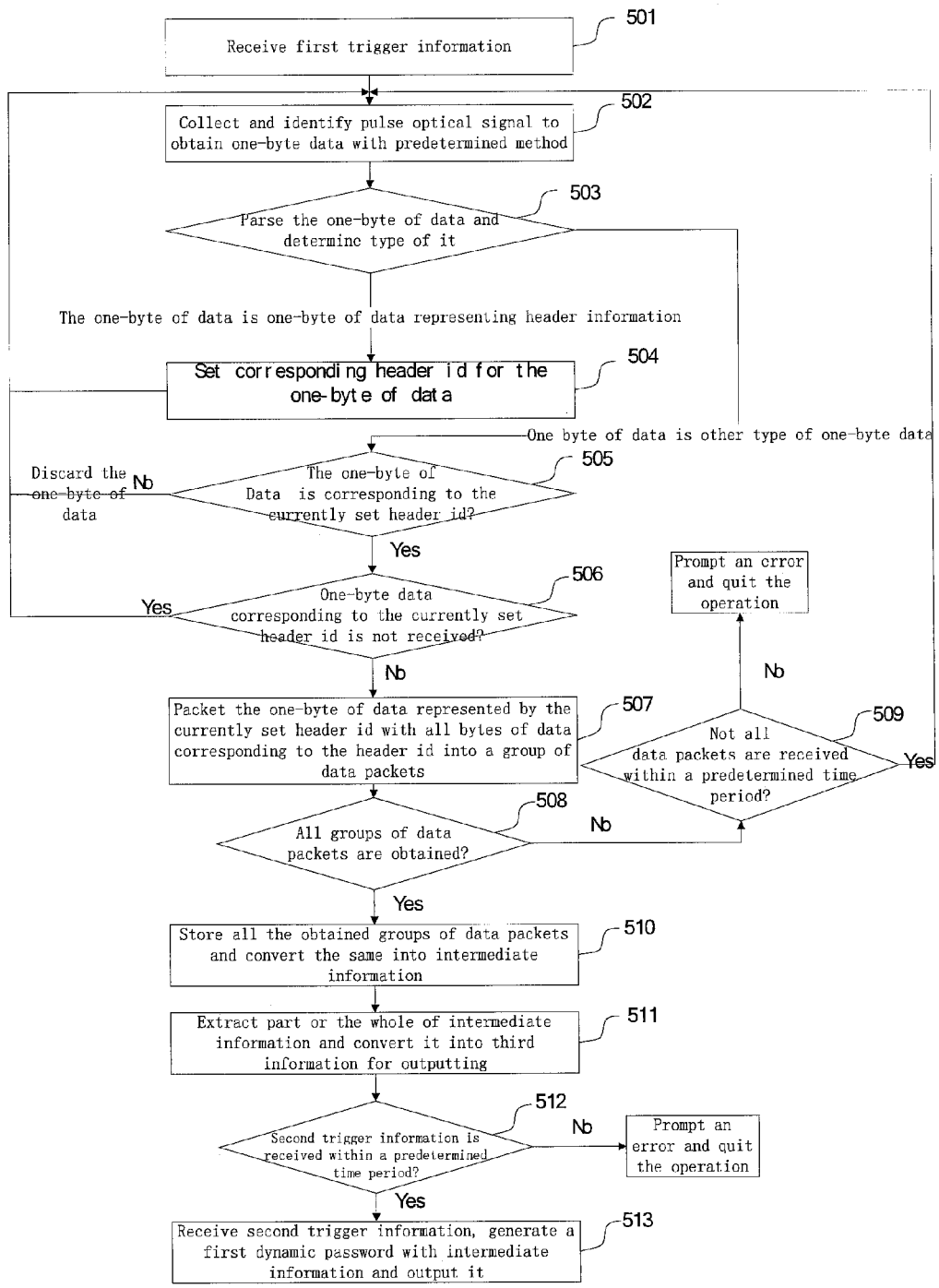
FIG. 4 illustrates a flow chart of another method for identifying and using pulse optical signal to generate an OTP provided by the embodiment 5.

FIG. 4 illustrates a flow chart of another method for identifying an optical pulse signal and generating a dynamic password with it provided by the embodiment.

For further optimizing perfecting the method provided by embodiment 3 of the invention, the signal identifying device generates a dynamic password according to an obtained data packet after obtaining it. The embodiment provides a process that the signal identifying device collects and identifies pulse optical signal to obtain all data packets, converts each received data packet and generates a dynamic password.

Specifically, in the embodiment, all units of data in the embodiment is provided in the format of bytes, and the method includes steps as below.

Step 501: receive first trigger information, which is confirmation information of beginning to collect pulse optical signal, and is input by a user.

Step 502: collect and identify pulse optical signal according to a predetermined method to obtain one byte of data with the method used in step b of embodiment 1.

Step 503: parse the one byte of data and determine type of it;

if the one byte of data is a one byte of data representing header information, step 504 is executed; and if the one byte of data is other type of byte of data, step 505 is executed.

The signal identifying device determines whether the one byte of data is one byte of data representing header information according to a predetermined packet header format.

Notably, predetermined id uses unusable information in ASCII code table as the packet header information in avoidance of mixture with other data information.

For example, the predetermined id uses a0, a1, a2, a3 and etc. as the data packet header information with a rule of taking the first four bytes as the header information id and taking the following four bytes as serial number of representing the header information, and if the first four bytes of the received and identified one-byte data is 1010, the one-byte data is determined as packet header information.

Step 503: the signal identifying device executes step 502 to obtain the next byte of data after determining that the received and identified one-byte data relates to one-byte data representing header information and repeats the execution and thus details of it are eliminated.

Step 504: set a corresponding packet header id for the one byte of data and return to step 502.

Step 505: determine whether the one byte of data corresponds to the currently set packet header id, if yes, go to step 506; if no, discard the one byte of data and go to step 502.

Step 506: determine whether any byte of data corresponding to the currently-set packet header id is not received; if yes, go to step 502; if no, go to step 507.

Specifically, the determining whether any byte of data corresponding to the currently set packet header id is not received aims at combining the one byte of data represented by the packet header id with all bytes of data corresponding to the packet header id to obtain a data packet in the following step 507, and the following step 506 is executed in case of a positive determination result; or step 502 is executed in case of a negative determination result and the one byte of data is obtained by going on collecting and identifying pulse optical signal till receiving all bytes of data corresponding to the currently set packet header id, and the following step is executed.

All bytes of data except for the one byte of data representing the packet header id in one data packet should corresponds to the byte of data representing header.

Step 507: combine the one byte of data represented by the currently set packet header id with all bytes of data corresponding to the currently set packet header id to obtain a group of data packets.

In the embodiment, each data packet includes header information and data content; or header information, data content and length; or header information, data content, length and a check bit.

In case that the signal identifying device receives and identifies a data packet representing packet header id includes only header information and data content or includes only header information, length and data content, it executes a step following step 507.

Step 508: determine whether all groups of data packets are obtained, if yes, go to step 510; if no, go to step 509.

The signal identifying device determinates whether all groups of data packets are received by determining whether packet header id of each data packet is identical to a predetermined packet header id.

Step 509: determine whether all groups of data packets are not obtained within a predetermined time period, if yes, prompt an error and quit the operation; if no, go to step 502.

Step 510: stores all obtained groups of data packets and converts the same into intermediate information.

The process of step 510 is same with that in step 409 of embodiment 4, and thus details of the step are eliminated herein.

Step 511: extract part or all of the intermediate information, and convert the extracted information into third information for outputting.

If part of the intermediate information is extracted as third information in step 511 of the embodiment, the third information for outputting is listed as below.

Personal identity code: 123456;
Account number: 11112222;
Amount: 45600.

Step 512: determine whether second trigger information is received within a predetermined time period; if yes, go to step 513; or if no, prompt an error and quit the operation.

Specifically, the second trigger information is confirmation information of the signal identifying device generating a dynamic password.

Preferably, the time period is 60 seconds in step 512 of the embodiment.

Step 513: receive the second trigger information, generate a dynamic password according to the intermediate information and output the first dynamic password with the method used in step 412 of embodiment 4 and the thus details of the step are eliminated herein.

Step 514: prompt an error and stop the operation.

In the embodiment 4, if the signal identifying device receives a pulse optical signal including information representing the personal identity code, it receives and validates the data packet representing the personal identity code, goes to the following step in case of a successful validation, or prompts an error in case of a failed validation.

The method of validating whether the personal identity code is correct includes that the signal identifying device compares each byte of data in the received and identified personal identity code to the corresponding bits of the predetermined personal identity code, goes on receiving and determining the next byte of information in case of a positive comparison result and with the same method, the signal identifying device successfully comparing all data representing the personal identity code indicates a correct personal identity code, or in case of a failed comparison because of a wrong bytem, the signal identifying device prompts an error.

If the data packet representing the header information, received and identified by the signal identifying device in step 507 includes header information, data content, length and a check bit, steps 509-510 can be replaced with steps 509-511.

Step 509': validate whether all obtained data packets are correct, if yes, perform step 511'; or if no, delete those incorrect data packets and perform step 510'.

The validating whether each data packet is correct is completed by checking the last check bit of the data packet.

Step 510': determine whether all correct data packets are not obtained within a predetermined time period, if yes, prompt an error and quit the operation; or if no, go back to step 502.

Step 511': store all the obtained groups of data packets and convert the same into intermediate information with the method used in step 410' of embodiment 4.

In embodiment 5, if the data packet representing the header information, received and identified by the signal identifying device includes header information, data content, length and a check bit and if the received pulse optical signal includes information representing a personal identity code in the following step, the signal identifying device receives and validates the data packet representing the personal identity code, and goes on the following step in case of a successful validation; or prompts an error in case of a failed validation.

The process of validating whether the personal identity code is correct includes that the signal identifying device determines whether the received length is identical to length of the predetermined personal identity code according to the predetermined personal identity code, if no, it determines that the personal identity code is not correct, and if yes, the signal identifying device goes on validating the data content;

the signal identifying device compares each byte of the received data content to the corresponding bits of the predetermined personal identity code, goes on receiving and determining the next byte of information in case of a successful comparison and with the same step, the signal identifying device successful comparing all data representing the personal identity code indicates a correct personal identity code; or in case of a failed comparison because of a wrong byte, the signal identifying device determines an incorrect personal identity code and prompts an error.

In all embodiments of the invention, once the cancellation information of the signal identifying device is triggered, the signal identifying device recovers to an original status of uncollecting pulse optical signal.

In the above embodiments of the invention, the first brightness indicates a brightness status identified by the signal identifying device and the second brightness indicates a darkness status identified by the signal identifying device; or the first brightness indicates the darkness status identified by the signal identifying device and the second brightness indicates the brightness status identified by the signal identifying device; and therefore the first brightness and the second brightness are relative conception which are divided by a critical status between them.

Embodiment 6

Figure 5:
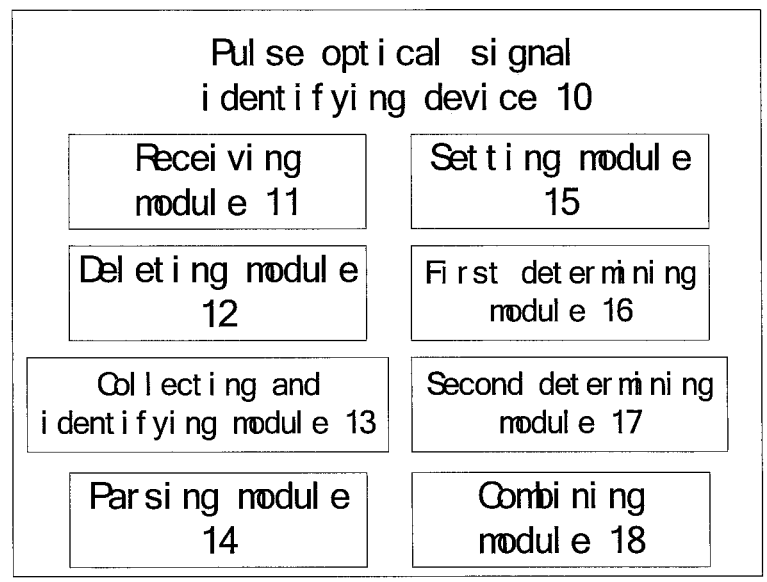
FIG. 5 illustrates a device for identifying pulse optical signal provided by the embodiment 6.

As shown in FIG. 5, a device 10 for identifying pulse optical signal, is provided in the embodiment 6 of the invention. The device 10 includes a receiving module 11, a deleting module 12, a collecting and identifying module 13, a parsing module 14, a setting module 15, a first determining module 16, a second determining module 17 and a combining module 18.

In the above, the receiving module 11 is configured to receive first trigger information;

the deleting module 12 is configured to delete data in the storage area in case that the receiving module 11 receives the first trigger information, and to discard the unit of data being parsed to be other type of data in case that the first determining module 16 obtains a negative result;

the collecting and identifying module 13 is configured to collect and identify pulse optical signal with a predetermined method to obtain one unit of data;

the parsing module 14 is configured to parse type of the unit of data;

the setting module 15 is configured to set a packet header id for the unit of data in case that type of the unit of data parsed by the parsing module 14 is the unit of data representing the header information;

the first determining module 16 is configured to determine whether the byte of data corresponds to a currently set packet header id in case that type of the unit of data being parsed by the parsing module 14 is other type of data;

the second determining module 17 is configured to determine whether any unit of data corresponding to the currently-set packet header id is not received in case that the first determining module 16 determines a positive result;

and a combining module 18 is configured to combine the unit of data representing by the currently-set packet header id with all units of data corresponding to the currently-set packet header id to obtain a group of data packets in case that the second determining module 17 determines a negative result.

Embodiment 7

Figure 6:
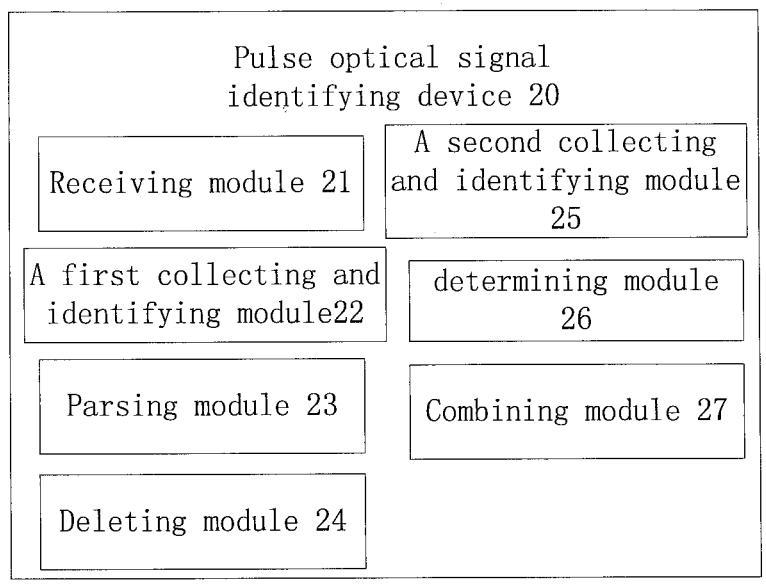
FIG. 6 illustrates a device for identifying pulse optical signal provided by the embodiment 7.

As shown in FIG. 6, another device 20 for identifying pulse optical signal is provided in the embodiment 7 of the invention. The device 20 includes a receiving module 21, a first collecting and identifying module 22, a parsing module 23, a deleting module 24, a second collecting and identifying module 25, a determining module 26 and a combining module 27.

In the above, the receiving module 21 is configured to receive first trigger information;

the first collecting and identifying module 22 is configured to collect and identify pulse optical signal to obtain one unit of data;

the parsing module 23 is configured to parse type of the unit of data;

the deleting module 24 is configured to delete the unit of data in case that type of the unit of data parsed by the parsing module 23 is other type of data;

the second collecting and identifying module 25 is configured to go on collecting and identifying pulse optical signal with a predetermined method to obtain one unit of data in case that type of the unit of data parsed by the parsing module 23 is one unit of data representing header information and the determining module 26 determines a negative result;

the determining module 26 is configured to determine whether all units of data corresponding to the unit of data representing the header information is received;

and the combining module 27 is configured to combine the unit of data representing the header information with all other units of data corresponding to it to obtain a group of data packets.

The above description are just preferred embodiments of the invention, not a limit to protection scope of the invention, and any modification or substitution apparent to those skilled in the art in accordance with what disclosed by the invention should fall within the protection scope of the invention. Therefore, protection scope of the invention should be based on the protection scope of the claims.

What is claimed is:

1. A method for identifying pulse optical signal, comprising performing the following steps by a hardware processor:
   A. receiving first trigger information and deleting data in a storage area;
   B. in response to the first trigger information, collecting and identifying a pulse optical signal with a predetermined method to obtain a unit of data;
   C. parsing the unit of data and determining type of the unit of data;
   if the unit of data is unit of data representing header information, performing D;
   if the unit of data is other type of unit of data, performing E;
   D. setting a corresponding packet header id for the unit of data and going back to B;
   E. determining whether the unit of data matches the currently-set packet header id; if yes, performing F; if no, discarding the unit of data and going back to B;
   F. determining whether there is unreceived unit of data corresponding to the currently set packet header id; if yes, going back to B, if no, performing G;
   G. packeting the unit of data represented by the currently-set packet header id and all units of data corresponding to the currently-set packet header id to obtain a group of data packets;
   wherein the predetermined method comprises:
   B1. identifying the pulse optical signal collected at the same time with a predetermined receiving method to obtain at least one bit of information and taking the at least one bit of information as one bit of information group;
   B2. determining whether the obtained at least one bit of information group constitutes one unit of data, if yes, combining the obtained at least one bit of information group to obtain a unit of data; if no, going back to B1.

2. The method for identifying pulse optical signal according to claim 1, wherein after packeting the unit of data represented by the currently-set packet header id, and all units of data corresponding to the currently-set packet header id to obtain a group of data packets, it further comprises performing the following steps by the hardware processor:
   H. determining whether all groups of data packets are obtained, if yes, performing I, if no, going back to B;
   I. converting all groups of data packets into intermediate information;
   J. extracting part or all of the intermediate information, converting the extracted information into third information and outputting the third information;

K. determining whether second trigger information is received within a predetermined time period; if yes, performing L; if no, prompting an error and quitting the operation;

L. generating a dynamic password according to the intermediate information and outputting the dynamic password.

3. The method for identifying pulse optical signal according to claim 1, wherein after packeting the unit of data represented by the currently-set packet header id, and all units of data corresponding to the currently-set packet header id to obtain a group of data packets, it further comprises performing the following steps by the hardware processor:

H. determining whether all groups of data packets are obtained, if yes, performing I, if no, going back to B;

I. validating whether all the obtained groups of data packets are correct, if yes, performing K; if no, removing the incorrect data packets and corresponding packet header id and performing J;

J. determining whether all the correct data packets are not obtained within a predetermined time period, if yes, prompting an error and quitting the operation; if no, going back to B;

K. converting all the obtained groups of data packets into intermediate information;

L. extracting part or all of the intermediate information and converting the extracted information into third information and outputting the third information;

M. determining whether second trigger information has been received within a predetermined time period; if yes, performing N, if no, prompting an error and quitting the operation;

N. generating a dynamic password according to the intermediate information and outputting the dynamic password.

4. The method for identifying pulse optical signal according to claim 1, wherein after packeting the unit of data represented by the currently-set packet header id and all units of data corresponding to the currently-set packet header id, to obtain a group of data packets, it further comprises performing the following steps by the hardware processor:

H. determining whether all groups of data packets are obtained, if yes, performing I, if no, going back to B;

I. validating whether all the obtained data packets are correct, if yes, performing J; if no, removing the incorrect data packets and corresponding packet header id and going back to B;

J. converting all the obtained groups of data packets into intermediate information;

K. extracting part or all of the intermediate information, converting the extracted information into third information and outputting the third information;

L. determining whether second trigger information is received within a predetermined time period, if yes, performing M; if no, prompting an error and quitting the operation;

M. generating a dynamic password according to the intermediate information and outputting the dynamic password.

5. The method for identifying pulse optical signal according to claim 1, wherein after packeting the unit of data represented by the currently-set packet header id and all units of data corresponding to the currently-set packet header id to obtain a group of data packets, it further comprises performing the following steps by the hardware processor:

H. determining whether all groups of data packets are obtained, if yes, performing J, if no, going back to I;

I. determining whether not all data packets are received within a predetermined time period, if yes, prompting an error and quitting the operation; if no, going back to B;

J. converting all the obtained groups of data packets into intermediate information;

K. extracting part or all of the intermediate information, converting the extracted information into third information and outputting the third information;

L. determining whether second trigger information is received within a predetermined time period, if yes, performing M; if no, prompting an error and quitting the operation;

M. generating a dynamic password according to the intermediate information and outputting the dynamic password.

6. The method for identifying pulse optical signal according to claim 1, wherein identifying pulse optical signal collected at the same time with a predetermined method comprises:

collecting the pulse optical signal emerging at the same time, identifying brightness status of at least one bit included in the pulse optical signal collected at the same time and obtaining each bit of information according to the identified brightness status; or collecting the pulse optical signal emerging at the same time, identifying color brightness of at least one bit included in the pulse optical signal collected at the same time, and decomposing each color brightness to obtain proportion of three primary colors and according to which three bits of information represented by each color brightness is obtained;

the step of parsing the unit of data comprises:

parsing to obtain a format of the unit of data and determining whether the format of the unit of data is identical to format of the predetermined packet header data; if yes, the unit of data is a unit of data representing header information, performing D; if no, the unit data is other type of unit of data, performing E;

before the step of obtaining one unit of data, the method further comprises:

collecting the pulse optical signal and identifying an id representing beginning to receive a unit of data;

the step of determining whether all groups of data packets are obtained comprises determining whether each set packet header id is identical to each predetermined packet header id.

7. The method for identifying pulse optical signal according to claim 1, wherein the generating a dynamic password according to the intermediate information and outputting the dynamic password comprises:

performing encryption computation on the intermediate information and a pre-stored first static factor to generate the dynamic password, and outputting the dynamic password; or performing encryption computation on the intermediate information, a first additional dynamic factor and the pre-stored first static factor to generate the dynamic password and outputting the dynamic password;

wherein the first additional dyanimic factor is a time factor; or a times factor; or a combination of a group of random numbers and the time factor, or a combination of a group of random numbers and the times factor.

8. A method for identifying pulse optical signal, comprising performing the following steps by a hardware processor:
   a. receiving first trigger information;
   b. in response to the first trigger information, collecting and identifying a pulse optical signal according to a predetermined method to obtain a unit of data;
   c. parsing the unit of data and determining type thereof, if the unit of data is a unit of data representing header information, going to d;
   if the unit of data is other type of unit of data, discarding the unit of data and going to b;
   d. continuing to collect and identify the pulse optical signal with the predetermined method to obtain a unit of data;
   e. determining whether all units of data corresponding to the unit of data representing the header information is received, if yes, performing f; if no, going back to d;
   f. packeting the unit of data representing the header information and all corresponding units of data to obtain a group of data packets;
   wherein the predetermined method further comprises:
   b1. identifying the pulse optical signal collected at the same time with a predetermined method to obtain at least one bit of information and taking the at least one bit of information as one bit of information group;
   b2. determining whether the at least one bit of information group can constitute a unit of data; if yes, combining the obtained at least one bit of information group into a unit of data; if no, going back to b1.

9. The method for identifying pulse optical signal according to claim 8, wherein after packeting the unit of data representing the header information and all corresponding units of data to obtain a group of data packets, it further comprises performing the following steps by the hardware processor:
   g. determining whether all groups of data packets are obtained, if yes, performing h; if no, going back to b;
   h. converting all the obtained groups of data packets into intermediate information;
   i. extracting part or all of the intermediate information, converting the extracted information into third information and outputting the third information;
   j. determining whether second trigger information is received within a predetermined time period, if yes, performing k; if no, prompting an error and quitting the operation;
   k. generating a dynamic password according to the intermediate information and outputting the dynamic password.

10. The method for identifying pulse optical signal according to claim 8, wherein after packeting the unit of data representing the header information and all corresponding units of data to obtain a group of data packets, it further comprises performing the following steps by the hardware processor:
   g. determining whether all groups of data packets are obtained, if yes, performing h; if no, going back to b;
   h. validating whether all the obtained data packets are correct, if yes, performing j; if no, removing the incorrect data packets and performing i;
   i. determining whether not all the correct data packets are obtained within a predetermined time period, if yes, prompting an error and quitting the operation; if no, going back to b;
   j. converting all the obtained groups of data packets into intermediate information;
   k. extracting part or all of the intermediate information, converting the extracted information into third information and outputting the third information;
   l. determining whether second trigger information is obtained within a predetermined time period, if yes, performing m; if no, prompting an error and quitting the operation;
   m. generating a dynamic password according to the intermediate information and outputting the dynamic password.

11. The method for identifying pulse optical signal according to claim 8, wherein after packeting the unit of data representing the header information and all corresponding units of data to obtain a group of data packets, it further comprises performing the following steps by the hardware processor:
   g. determining whether all groups of data packets are obtained, if yes, performing h; if no, going back to b;
   h. validating whether all the obtained data packets are correct, if yes, performing i; if no, removing the incorrect data packets and going back to b;
   i. converting all the obtained groups of data packets into intermediate information;
   j. extracting part or all of the intermediate information, converting the extracted information into third information and outputting the third information;
   k. determining whether second trigger information is obtained within a predetermined time period, if yes, performing l; if no, prompting an error and quitting the operation;
   l. generating a dynamic password according to the intermediate information and outputting the dynamic password.

12. The method for identifying pulse optical signal according to claim 8, wherein after packeting the unit of data representing the header information and all corresponding units of data to obtain a group of data packets, it further comprises performing the following steps by the hardware processor:
   g. determining whether all groups of data packets are obtained, if yes, performing i; if no, going back to h;
   h. determining whether not all data packets are obtained within a predetermined time period; if yes, prompting an error and quitting the operation; if no, going back to b;
   i. converting all the obtained groups of data packets into intermediate information;
   j. extracting part or all of the intermediate information, converting the extracted information into third information and outputting the third information;
   k. determining whether second trigger information is received within a predetermined time period, if yes, performing l; if no, prompting an error and quitting the operation;
   l. generating a dynamic password according to the intermediate information and outputting the dynamic password.

13. The method for identifying pulse optical signal according to claim 8,
   the identifying pulse optical signal collected at the same time with a predetermined method to obtain at least one bit of information comprises:
   collecting the pulse optical signal emerging at the same time, identifying brightness status of at least one bit included in the pulse optical signal collected at the same time and obtaining each bit of information according to the identified brightness status; or
   collecting the pulse optical signal emerging at the same time, identifying at least of one color brightness representing the bit of information included in the pulse optical signal collected at the same time, decomposing each color brightness to obtain a proportion of the three primary colors and according to which three bits of information represented by each color brightness is obtained;
the parsing the unit of data comprises:
parsing to obtain a format of the unit of data and determining whether the format of the unit of data is identical to the format of the predetermined packet header; if yes, the unit of data being the unit of data representing the header information, performing d; if no, the unit of data being other type of unit of data, discarding the unit of data and going back to b;
before obtaining a unit of data, the method further comprises collecting the pulse optical signal and identifying an id representing beginning to receive one unit of data;
the determining whether all groups of data packets are obtained comprises determining whether format of each byte of the obtained data representing the packet header information is identical to the format of predetermined packet header information.

14. The method for identifying pulse optical signal according to claim 8, wherein after parsing the unit of data as the unit of data representing the header information, the method further comprises performing the following steps by the hardware processor:
setting a packet header id for the unit of data representing the header information;
the determining whether all groups of data packets are obtained comprises determining whether each already-set packet header id is identical to each preset packet header id;
the first additional dynamic factor is a time factor; or a times factor; or a combination of a group of random numbers and the time factor; or a combination of a group of random numbers and the times factor.

15. The method for identifying pulse optical signal according to claim 9, wherein the generating a dynamic password according to the intermediate information and outputting the dynamic password comprises:
performing encryption computation on the intermediate information and the prestored first static factor to generate the dynamic password, and outputting the dynamic password;
or
performing encryption computation on the intermediate information, a first additional dynamic factor and the prestored first static factor to generate the dynamic password, and outputting the dynamic password.

16. The method for identifying pulse optical signal according to claim 10, wherein the generating a dynamic password according to the intermediate information and outputting the dynamic password comprises:
performing encryption computation on the intermediate information and the prestored first static factor to generate the dynamic password, and outputting the dynamic password; or
performing encryption computation on the intermediate information, a first additional dynamic factor and the prestored first static factor to generate the dynamic password, and outputting the dynamic password.

17. The method for identifying pulse optical signal according to claim 11, wherein the generating a dynamic password according to the intermediate information and outputting the dynamic password comprises:
performing encryption computation on the intermediate information and a first prestored first static factor to generate the dynamic password and outputting the dynamic password; or
performing encryption computation on the intermediate information, a first additional dynamic factor and the prestored first static factor to generate the dynamic password, and outputting the dynamic password.

18. The method for identifying pulse optical signal according to claim 12, wherein the generating a dynamic password according to the intermediate information and outputting the dynamic password comprises:
performing encryption computation on the intermediate information and a prestored first static factor to generate the dynamic password, and outputting the dynamic password; or
performing encryption computation on the intermediate information, a first additional dynamic factor and the prestored first static factor to generate the dynamic password, and outputting the dynamic password.

19. A device for identifying pulse optical signal, comprising a hardware processor, configured to execute program units, the program units comprising: a receiving module, a deleting module, a collecting and identifying module, a parsing module, a setting module, a first determining module, a second determining module and a combining module;
wherein,
the receiving module is configured to receive first trigger information;
the deleting module is configured to delete data in a storage area in case that the receiving module receives the first trigger information;
the collecting and identifying module is configured to, in response to the first trigger information, collect and identify a pulse optical signal with a predetermined method to obtain a unit of data;
the parsing module is configured to parse type of the unit of data;
the setting module is configured to set a corresponding packet header id for the unit of data in case that the type of the unit of data parsed by the parsing module is a unit of data representing the header information;
the first determining module is configured to determine whether the unit of data corresponds to the currently-set packet header id in case that type of the unit of data parsed by the parsing module is other type of unit of data;
the second determining module is configured to determine whether a unit of data corresponding to the currently-set packet header id is not obtained in case that the first determining module determines a positive result; and
the combining module is configured to packet the unit of data represented by the currently-set packet header id and all units of data corresponding to the currently-set packet header id to obtain a group of data packets in case that the second determining module determines a negative result;
wherein the collecting and identifying module is further configured to perform the predetermined method which comprises:
B1. identifying the pulse optical signal collected at the same time with a predetermined receiving method to obtain at least one bit of information and taking the at least one bit of information as one bit of information group;
B2. determining whether the obtained at least one bit of information group constitutes one unit of data, if yes, combining the obtained at least one bit of information group to obtain a unit of data; if no, going back to B1.

20. A device for identifying pulse optical signal, comprising a hardware processor, configured to execute program units, the program units comprising: a receiving module, a first collecting and identifying module, a parsing module, a deleting module, a second collecting and identifying module, a determining module and a combining module;

the receiving module is configured to receive a first trigger information;

the first collecting and identifying module is configured to, in response to the first trigger information, collect and identify the pulse optical signal with a predetermined method to obtain a unit of data;

the parsing module is configured to parse type of the unit of data;

the deleting module is configured to delete the unit of data in case that type of the unit of data parsed by the parsing module is other type of unit of data;

the second collecting and identifying module is configured to continue to collect and identify the pulse optical signal with the predetermined method to obtain a unit of data in case that type of the unit of data parsed by the parsing module is a unit of data representing header information;

the determining module is configured to determine whether all units of data corresponding to the unit of data representing the header information is received; and the combining module is configured to packet the unit of data representing the header information and all corresponding units of data to obtain a group of data packets in case that the determining module determines a positive result;

wherein the first collecting and identifying module and the second collecting and identifying module are further configured to perform the predetermined method which comprises:

b1. identifying the pulse optical signal collected at the same time with a predetermined method to obtain at least one bit of information and taking the at least one bit of information as one bit of information group;

b2. determining whether the at least one bit of information group can constitute a unit of data; if yes, combining the obtained at least one bit of information group into a unit of data; if no, going back to b1.

\* \* \* \* \*